United States Patent Office 3,249,557
Patented May 3, 1966

3,249,557
PROCESS FOR PRODUCING AN ALUMINA
CATALYST BASE
Stephen M. Oleck, Moorestown, N.J., assignor to Socony
Mobil Oil Company, Inc., a corporation of New York
No Drawing. Filed June 25, 1962, Ser. No. 205,118
9 Claims. (Cl. 252—463)

This invention relates to a process for producing an alumina catalyst base. More particularly, the invention relates to a unique process for preparing substantially pure gamma alumina trihydrate, to preparing controlled mixtures of gamma alumina trihydrate and beta alumina trihydrate and to the subsequent preparation of substantially pure eta alumina.

As is well known, the nomenclature which is used in describing various aluminas is indefinite, confusing and nonuniform. For purposes of this specification and appended claims, the terms adopted for the identification of various types of alumina trihydrate in the technical paper entitled "Alumina Properties—Technical Paper No. 10" (second revision) published by the Aluminum Company of America, 1960, will be used. The term "gamma alumina trihydrate," as used herein, is defined in the prior art as Nordstrandite, bayerite II or randomite, which is described as having an X-ray diffraction intensity line at 4.79 A (Cu K radiation). The terms "gamma alumina trihydrate" and "Nordstrandite" are used synonymously in the present application. The term "beta alumina trihydrate," as used herein, is described as bayerite by the above-described technical paper. The gamma alumina trihydrate produced by the process of this invention can be substantially devoid of any form of gibbsite known in the art as an alpha alumina trihydrate. An additional embodiment of the invention is related to the preparation of controlled mixtures of gamma alumina trihydrate and beta alumina trihydrate.

The use of alumina for bases for preparing various platinum metal catalysts is well established in catalytic reforming of petroleum hydrocarbons. It has been found that it is highly desirable in the preparation of alumina-containing reforming catalysts to utilize an alumina base which has a substantial amount of crystalline alumina trihydrates in its uncalcined form. Reforming catalysts prepared from alumina predominating in alumina trihydrates have, in general, demonstrated outstanding results in terms of activity and aging stability.

There are several procedures known to prepare an alumina base which has high percentages of crystalline gamma alumina trihydrates but these processes, in general, provide mixtures of varying quantities of the combination of gibbsite, bayerite or beta alumina trihydrate and randomite or gamma alumina trihydrate. In these known processes, extensive washing procedures, prolonged aging conditions and extensive filtration procedures are generally necessary to provide an adequate alumina base. Such washing, aging, and filtration methods have been a tedious time-consuming operation requiring the careful attention of operators, imposing an economic burden on the overall method of catalyst manufacture. For use on a commercial basis, it is highly desirable to utilize a process which will avoid any extensive washing procedures and prolonged aging conditions and at the same time provide a uniform and satisfactory alumina base having a high gamma alumina trihydrate content and/or controlled amounts of gamma alumina trihydrate and beta alumina trihydrate mixtures.

It is an object of this invention to provide a process which will produce substantially pure gamma alumina trihydrate. A further object relates to a process for producing substantially pure gamma alumina trihydrate which avoids any extensive washing procedures and prolonged aging conditions. An additional object of the invention is directed to providing a process which will produce controlled mixtures of gamma alumina trihydrate and beta alumina trihydrate. Yet another object is to provide a simple process to produce substantially pure eta alumina. The above and other objects which will be apparent to those skilled in the art are realized in accordance with this invention.

Accordingly, one embodiment of this invention is directed to a process for producing gamma alumina trihydrate by contacting substantially pure aluminum with an aqueous ammonium hydroxide solution containing from about 23 weight percent ammonia to a completely saturated ammonia-containing aqueous solution in the presence of a catalytic amount of mercury or a mercury compound.

Another embodiment of this invention relates to a process for producing a controlled mixture of beta alumina trihydrate and gamma alumina trihydrate by contacting substantially pure aluminum with an aqueous ammonium hydroxide solution containing from about 15 to about 23 weight percent ammonia in the presence of a catalytic amount of mercury or a mercury compound. The amount of beta alumina trihydrate in the mixture can range from about 5 to about 95 weight percent of the total mixture.

A further embodiment of the invention is directed to a process for producing substantially pure eta alumina by heating the substantially pure gamma alumina trihydrate and the reaction mixtures of beta alumina trihydrate and gamma alumina trihydrate produced by the above-described processes at temperatures exceeding about 350° F.

The above-described reaction mixture of aluminium and aqueous ammonium hydroxide yields an aqueous slurry having a solids content from about 10 to about 20 percent of the alumina trihydrate product. After the reaction is completed, the slurry quickly settles and the gamma alumina trihydrate or mixtures thereof with beta alumina trihydrate can be readily recovered by decantation. On the other hand, catalytic agents such as platinum metal compounds in the form of soluble compounds or as sols or any other convenient form can be added directly to the alumina slurry to produce the desirable metal-alumina catalysts. Thus, the alumina trihydrate product can be recovered directly or in combination with a catalytic agent without prolonged aging, intermediate washing or filtration and can be thereafter dried and calcined.

The process of the invention is advantageous since the resulting gamma alumina trihydrate or the gamma alumina trihydrate and beta alumina trihydrate mixtures are free from impurities and further may be directly impregnated with the catalytic agents without undergoing intermediate filtering, washing, drying and/or calcining operations.

The aluminum metal used in production of the alumina slurry may be any substantially pure aluminum. Since the process will afford a slurry of practically pure alumina, it is preferred to effect the reaction between aluminum metal having a purity of at least 99.7% and, generally, 99.99% or greater and the concentrated aqueous ammonium hydroxide solution to produce the resulting slurry of high purity gamma alumina trihydrate.

The physical form of the aluminum metal determines, to a marked degree, the rate of reaction between the aluminum and aqueous ammonium hydroxide solution. Other conditions remaining constant, the higher the surface area of the aluminum exposed to the water-ammonia mixture, the faster is the rate of reaction. Accordingly, it is generally preferable to use aluminum having a large exposed surface area particularly in the form of pieces having at least one dimension of substantially not more than 0.008 inch. Aluminum in sheet or ribbon form, as well as granulated or pelleted aluminum, is also suitable. Also aluminum in the form of large pieces or ingots may be employed, if time of reaction is not important. However, it is generally preferred that the aluminum used have a surface area in excess of 1000 square inches per pound.

Mercury or a mercury compound is necessarily present during the reaction of aluminum and ammonium hydroxide to accelerate the reaction forming the desired slurry of alumina. It would appear that amalgamated aluminum is formed upon contact of the aluminum with mercury or a mercury compound. The latter upon reaction with aluminum undergoes reduction to metallic mercury.

The mercury compound or mercury is generally present in catalytic amounts, generally, corresponding to an amount of mercury of between about 0.1% and about 10% by weight of the aluminum. Particularly, it is preferred to employ an amount of mercury or mercury compound with respect to the quantity of alumina slurry produced such that all of the mercury introduced is physically contained by occulsion, adsorption or other means in the resultant alumina slurry. The use of such amounts of mercury or mercury compound corresponding to an amount of mercury of between about 0.1% and about 1% by weight of the aluminum, have been found to be particularly desirable since the necessity of physically settling out mercury from the alumina slurry formed such as is essential with the use of much larger quantities of mercury or mercury compound, is thereby eliminated.

In addition to metallic mercury, the mercury compound employed is selected from the following group and may be a mixture of two or more of these compounds: mercuric acetate, mercuric bromide, mercuric chloride, mercuric iodide, mercuric fluoride, mercuric nitrate, mercuric oxide, mercuric benzoate, mercuric oxalate, mercurous carbonate, mercuric chlorate, mercurous acetate, mercuric bromate, mercurous bromate, mercurous bomide, mercurous fluoride, mercurous oxide, mercurous sulfate, mercuric sulfate, mercurous nitrate and the like. The above list is not considered exhaustive since it is further contemplated that basic mercuric salts, complexes of mercury compounds, and other inorganic or organic mercury compounds may also be used. Preference, however, is accorded those mercuric compounds which tend to be more soluble in the ammonium hydroxide solution. Mercuric nitrate and mercuric chloride used as the catalytic agents in the process of the invention, provide acceptable reaction rates and the desired product; however, since mercuric nitrate tends to be more soluble in ammonium hydroxide solution, the use of this catalyst in the production of gamma alumina trihydrate or mixtures of gamma and beta alumina trihydrate substantially increases the reaction rate over the mercuric chloride catalyst utilizing the same reaction conditions.

The velocity of the reaction of the aluminum is dependent upon the extent of exposed surface area of the aluminum, the type of mercury compound used and/or the amount of mercury or mercury compound present in the reaction mixture. The reaction speed is further dependent on the degree of agitation or the rate at which fresh surfaces of aluminum are exposed to contact with the ammonium hydroxide solution. It may, therefore, be desirable to effect agitation in the reaction mixture forming the alumina product. In some instances, it may be desirable to ball mill the aluminum metal continuously or intermittently in the ammonium hydroxide solution containing mercury or mercury compound to thereby expose fresh surfaces of the aluminum metal and subsequent reaction to alumina.

The temperature of the process of the invention can vary from just above the freezing point of the solution about 30° F. to about 110° F., depending on the catalyst used, concentration of the catalyst among other variables. It is preferred to maintain the temperature at such a level so that the highest concentration of ammonia will be retained in the ammonium hydroxide solution. It has been discovered that in the process of the invention when the concentration of ammonia falls below about 23 weight percent, the substantially pure gamma alumina trihydrate product will not be obtained. While, if the ammonia concentration falls below about 15, the mixtures of gamma and beta alumina trihydrates are not obtained. Therefore, if the higher temperatures of the process are deemed necessary, it is then desirable to conduct the reaction process under pressure to avoid the loss of ammonia concentration from the ammonium hydroxide solution so as to provide the desired alumina trihydrate product.

An important variable affecting the resulting product of this process, is the ammonia concenrtation of the ammonia hydroxide solution. If the ammonia concentration falls below 23 weight percent of the aqueous ammonium hydroxide solution, the substantially pure gamma alumina trihydrate will not be produced. It is, therefore, desirable to maintain the ammonia concentration of the ammonium hydroxide solution above 23 weight percent and preferably to utilize a substantially saturated ammonia ammonium hydroxide solution to produce the desired gamma alumina trihydrate product. In preparing the gamma and beta alumina trihydrate mixtures, the amounts of the components can be controlled by utilizing various concentrations of the aqueous ammonium hydroxide reactant. For example, utilizing 14 weight percent ammonium hydroxide, substantially pure beta alumina trihydrate was produced. An 18 weight percent ammonium hydroxide solution produced a mixture of 60 weight percent gamma alumina trihydrate and 40 weight percent beta alumina trihydrate. A 22 weight percent ammonium hydroxide solution produced a mixture of 92 weight percent of gamma alumina trihydrate and 8 weight percent beta alumina trihydrate.

The amount of ammonium hydroxide solution used in the process should be present in such amounts so as to afford a resulting alumina slurry having a solids content of about 10 to about 20 percent by weight. Such slurry, if desired, can be directly impregnated with a catalytic agent solution such as a solution of a platinum compound to produce the desired catalyst. Impregnation of the alumina while in the form of an aqueous slurry assures intimate contact and good mixing between alumina and the catalytic agent leading to a reproducible product of consistently uniform characteristics.

The reaction between ammonium hydroxide solution and aluminum is preferably carried out for such period of time until the aluminum is essentially entirely converted to hydrous alumina. Under such conditions, conversion of the aluminum to hydrous alumina is essentially complete and so separation of unreacted aluminum metal from the resulting slurry of alumina is not required. Thus, the alumina formed need not be purified by filtering and water washing. These latter steps are unnecessary since no undesirable foregin, non-volatile materials are introduced during the preparation of the alumina. A small amount of residual metallic mercury to the extent of 0.05 to 0.5 percent by weight of the alumina may be present after formation of the alumina slurry. This small amount of mercury can be removed during the subsequent drying and/or calcining steps. In some instances, it has been found desirable to remove the small amount of mercury from the alumina slurry by boiling the slurry for 0.5 to 6 hours. Such treatment has been found sufficient to drive off substantially all residual mercury from the alumina so that the mercury content thereof is less than 100 parts per million. Alternatively, it has been found that substantially all of the residual mercury may be removed from the alumina slurry by bubbling steam therethrough generally for a period of from about 0.5 to about 2 hours.

The alumina trihydrate product produced by the process of this invention can be recovered from the aqueous slurry by decantation or by filtration. This alumina in the aqueous slurry settles very rapidly for aluminas of this type. In only a few hours, a clear supernatant liquid forms which can be decanted easily to give alumina concentrations much higher than the original. This is an advantage in that the ammonia present can be recovered easily for re-use if desired. This feature also reduces the amount of liquid to be evaporated subsequently and thus makes the process more economical. The alumina slurry, prepared herein, can also be filtered very readily and washed easily if it is desirable to remove the ammonia.

The final alumina product, produced by this process can be used as the slurry or in a dried or calcined form. If the slurry is to be dried, drying temperatures above about 350° F., preferably above about 400° F., but below the thermal destruction temperature in an oxygen-containing gas such as air, for a sufficient period of time, will convert the gamma alumina trihydrate and the mixtures of gamma and beta alumina trihydrate to eta alumina. (As described in Alumina Properties—Technical Paper No. 10 [second revision] published by the Alumina Company of America (1960).) Thus, the unique method of preparing substantially pure eta alumina is greatly simplified by avoiding various purification steps such as filtration, water washing, and the like, and providing an economically attractive, commercially feasible process.

The following examples will serve to illustrate the process of the present invention without limiting the same:

EXAMPLE 1

To 50 grams of aluminum metal (99.99% purity) turnings of about 0.006 inch thickness in a round bottom flask were added 700 cubic centimeters of concentrated aqueous ammonia (27.6% ammonia by weight) solution and 0.25 gram mercuric chloride dissolved in 50 cubic centimeters water. This mixture was then stirred and maintained at about 80° F. by placing the flask in a water bath for about 24 hours after which time the reaction was essentially complete. A portion of the resulting slurry was dried in an oven at 240° F. with air circulation an analyzed by X-ray diffraction as 100% gamma alumina trihydrate.

Another portion of the above slurry was dried at 240° F., broken to fine powder, tabletted to ⅛ inch diameter by 1/16 inch thickness and calcined in a muffle furnace with air flow through the furnace at temperatures listed in Table I below to produce eta alumina. These samples were analyzed and had the following properties:

TABLE I

| Calcining temperature, °F | 650 | 750 | 850 | 950 | 1,050 |
|---|---|---|---|---|---|
| Particle density, g./cc | 1.30 | 1.26 | 1.26 | 1.25 | 1.24 |
| Real density, g./cc | 2.98 | 3.05 | 3.12 | 3.17 | 3.25 |
| Pore volume, cc./g | 0.434 | 0.469 | 0.472 | 0.485 | 0.496 |
| Surface area, square meters per gram | 443 | 468 | 444 | 387 | 297 |
| Average pore diameter, Angstrom units | 39 | 40 | 43 | 50 | 67 |

EXAMPLE 2

To 50 grams of aluminum metal (99.99% purity) turnings of about 0.006 inch thickness in a round bottom flask were added 700 cubic centimeters of concentrated aqueous ammonia (27.6% ammonia by weight) solution, and 0.25 gram mercuric nitrate dissolved in 50 cubic centimeters water. This mixture was then stirred and maintained at about 80° F. by placing the flask in a water bath for about 24 hours after which time the reaction was essentially complete. A portion of the resulting slurry was dried in an oven at 240° F. with air circulation and analyzed by X-ray diffraction as 100% gamma alumina trihydrate.

EXAMPLE 3

To 50 grams of aluminum metal (99.99% purity) turnings of about 0.006 inch thickness in a round bottom flask were added 350 cubic centimeters of concentrated aqueous ammonia, 350 cubic centimeters water solution and 0.25 gram mercuric chloride dissolved in 50 cubic centimeters water. This mixture was then stirred and maintained at about 80° F. by placing the flask in a water bath for about 24 hours at which time the reaction was essentially complete. A portion of the resulting slurry was dried in an oven at 240° F. with air circulation and analyzed by X-ray diffraction as beta alumina trihydrate.

EXAMPLE 4

To 65 grams of aluminum metal (99.99% purity) turnings of about 0.006 inch thickness in a round bottom flask were added a solution containing 900 cubic centimeters of concentrated aqueous ammonia, 0.4 gram mercuric nitrate and 450 cubic centimeters additional water. The calculated concentration of $NH_3$ is 18 weight percent. This mixture was stirred and maintained at about 80° F. in a bath for a day. A portion was removed, dried at 240° F. in the oven drier. The dried solids were 60% gamma alumina trihydrate by X-ray analysis and about 35% beta alumina trihydrate.

EXAMPLE 5

The above experiment was repeated except that the additional water to the ammonia solution was 225 cubic centimeters; the calculated concentration was 22 weight percent ammonia. The dried solids were about 90% gamma alumina trihydrate by X-ray analysis and about 8% beta alumina trihydrate.

EXAMPLE 6

The above experiment of Example 4 was again repeated except that the additional water to the ammonia solution was 112 cubic centimeters; the calculated concentration was 24.6 weight percent ammonia. The dried solids were over 95 weight percent gamma alumina trihydrate by X-ray analysis.

EXAMPLE 7

To 10 grams of aluminum metal (99.99% purity) turnings of about 0.006 inch thickness were added 140 cubic centimeters of concentrated aqueous ammonia (30 weight percent $NH_3$). The mixture was allowed to react at about 75° F. for a day. The liquid containing the suspended alumina hydrate solids was decanted, dried at 240° F. The weight of solids was 0.3 gram, or about 1 weight percent of the alumina possible if all the aluminum reacted.

It is to be understood that the foregoing description is merely illustrative of preferred embodiments of the invention of which many variations may be made by those skilled in the art within the scope of the following claims without departing from the spirit thereof.

What is claimed is:

1. A process for the manufacture of substantially pure Nordstrandite alumina which comprises reacting substantially pure aluminum with an aqueous ammonium hydroxide solution containing from about 23 weight percent ammonia to a completely saturated ammonia-containing solution at temperatures in the range from about 30° F. to about 110° F. in the presence of between about 0.1% and about 10% by weight of the aluminum of a material selected from the group consisting of mercury and a mercury compound, whereby an aqueous slurry containing said pure Nordstrandite alumina as the solid component is formed.

2. A process according to claim 1, wherein the catalytic material is a mercury compound selected from the group consisting of: mercuric acetate, mercuric bromide, mercuric chloride, mercuric iodide, mercuric fluoride, mercuric nitrate, mercuric oxide, mercuric benzoate, mercuric oxalate, mercurous carbonate, mercuric chlorate, mercurous acetate, mercuric bromate, mercurous bromate, mercurous bromide, mercurous fluoide, mecurous oxide, mercurous sulfate, mercuric sulfate, and mercurous nitrate.

3. A process for the manufacture of mixtures of Nordstrandite alumina and beta alumina trihydrate which comprises reacting substantially pure aluminum with an aqueous ammonium hydroxide solution containing from about 15 weight percent to about 23 weight percent ammonia in the presence of about 0.1% to about 10% by weight of catalytic mercury, whereby an aqueous slurry containing a mixture of the aforementioned aluminas as the solid component is formed.

4. A process according to claim 3, wherein said catalytic mercury is a mercuric compound selected from the group consisting of mercuric chloride and mercuric nitrate.

5. A process for the manufacture of substantially pure eta alumina which comprises reacting substantially pure aluminum with an aqueous ammonium hydroxide solution containing from about 15 weight percent ammonia to a completely saturated ammonia-containing solution at temperatures from about 30° F. to about 110° F. in the presence of about 0.1% to about 10% by weight of a material selected from the group consisting of mercury and a mercury compound to produce an aqueous slurry mixture containing Nordstrandite alumina and beta alumina trihydrate having a solids content between about 10 to about 20 weight percent, recovering the thus formed alumina and heating at temperatures above about 350° F. and below the thermal destruction temperature of eta alumina for a period of time sufficient to convert the recovered alumina to eta alumina.

6. A process according to claim 5 wherein said material is a mercury compound selected from the group consisting of mercuric chloride and mercuric nitrate.

7. A process for the manufacture of substantially pure eta alumina which comprises reacting substantially pure aluminum with an aqueous ammonium hydroxide solution containing from about 23 weight percent ammonia to a completely saturated ammonia-containing solution at temperatures from about 30° F. to about 110° F. in the presence of about 0.1% to about 10% by weight of a material selected from the group consisting of mercury and a mercury compound to produce an aqueous slurry mixture of Nordstrandite alumina, recovering the Nordstrandite alumina and heating at temperatures above about 350° F. and below the thermal destruction temperature of eta alumina to convert the Nordstrandite alumina to eta alumina.

8. A process for the manufacture of substantially pure eta alumina which comprises reacting a substantially pure aluminum with an aqueous ammonium hydroxide solution containing from about 15 to about 23 weight percent ammonia at temperatures from about 30° F. to about 110° F. in the presence of about 0.1% to about 10% by weight of a material selected from the group consisting of mercury and a mercury compound to produce an aqueous slurry mixture of Nordstrandite alumina and beta alumina trihydrate, recovering said alumina mixture and heating at temperatures above about 350° F. and below the thermal destruction temperature of eta alumina for a period of time sufficient to convert the recovered alumina mixture to eta alumina.

9. A process according to claim 8 wherein said material is a mercury compound selected from the group consisting of mercuric chloride and mercuric nitrate.

References Cited by the Examiner

UNITED STATES PATENTS

| | | | |
|---|---|---|---|
| 2,733,219 | 1/1956 | Bloch | 23—143 X |
| 2,804,433 | 8/1957 | Hevert et al. | 23—143 X |
| 2,820,693 | 1/1958 | Hevert et al. | 23—143 |
| 2,871,096 | 1/1959 | Hevert et al. | 23—143 |
| 2,872,418 | 2/1959 | Hevert et al. | 23—143 X |
| 2,958,581 | 11/1960 | Hevert et al. | 23—143 |
| 2,958,582 | 11/1960 | Hevert et al. | 23—143 |
| 2,958,583 | 11/1960 | Hevert et al. | 23—143 |
| 2,989,372 | 6/1961 | Gilbert | 23—143 |
| 3,042,628 | 7/1962 | Cramer et al. | 23—143 X |

OTHER REFERENCES

Newsome et al., "Alumina Properties," Technical Paper No. 10, 2nd rev., 1960, Aluminum Co. of America, Pittsburgh, Pa., 88 pages (page 63 of particular interest).

BENJAMIN HENKIN, *Primary Examiner.*

MAURICE A. BRINDISI, *Examiner.*

H. T. CARTER, *Assistant Examiner.*